Sept. 28, 1971  G. G. GAERTNER  3,608,287
COMBINATION CUTTER AND CONDITIONER FOR ROW FORAGE
Filed May 6, 1969  4 Sheets-Sheet 2
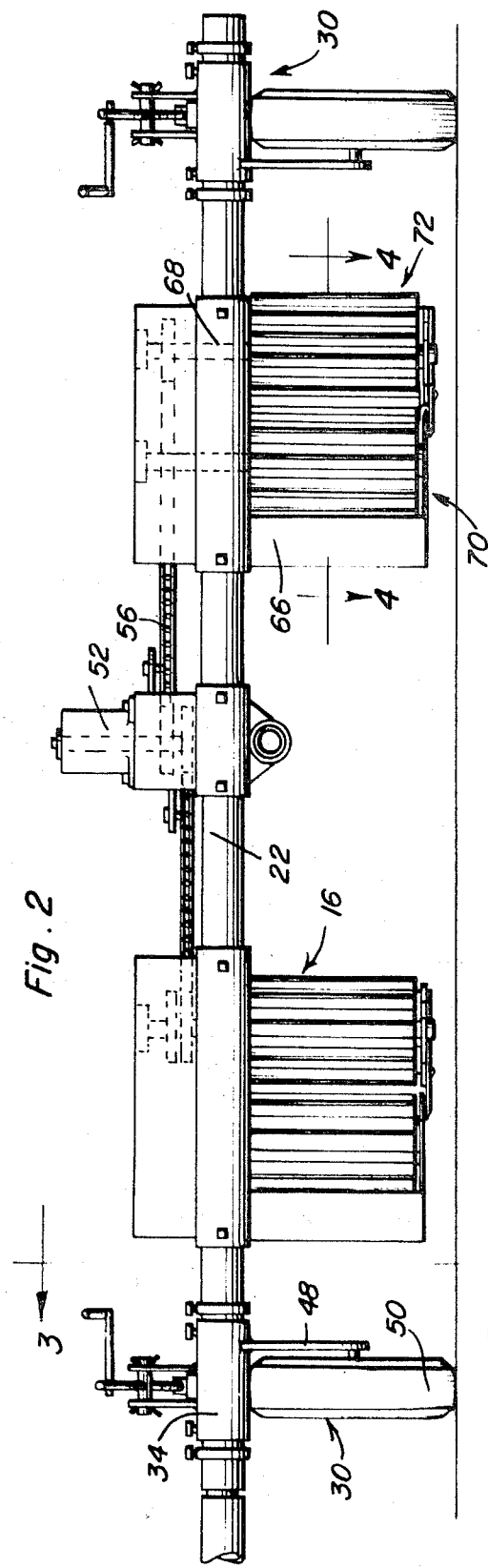
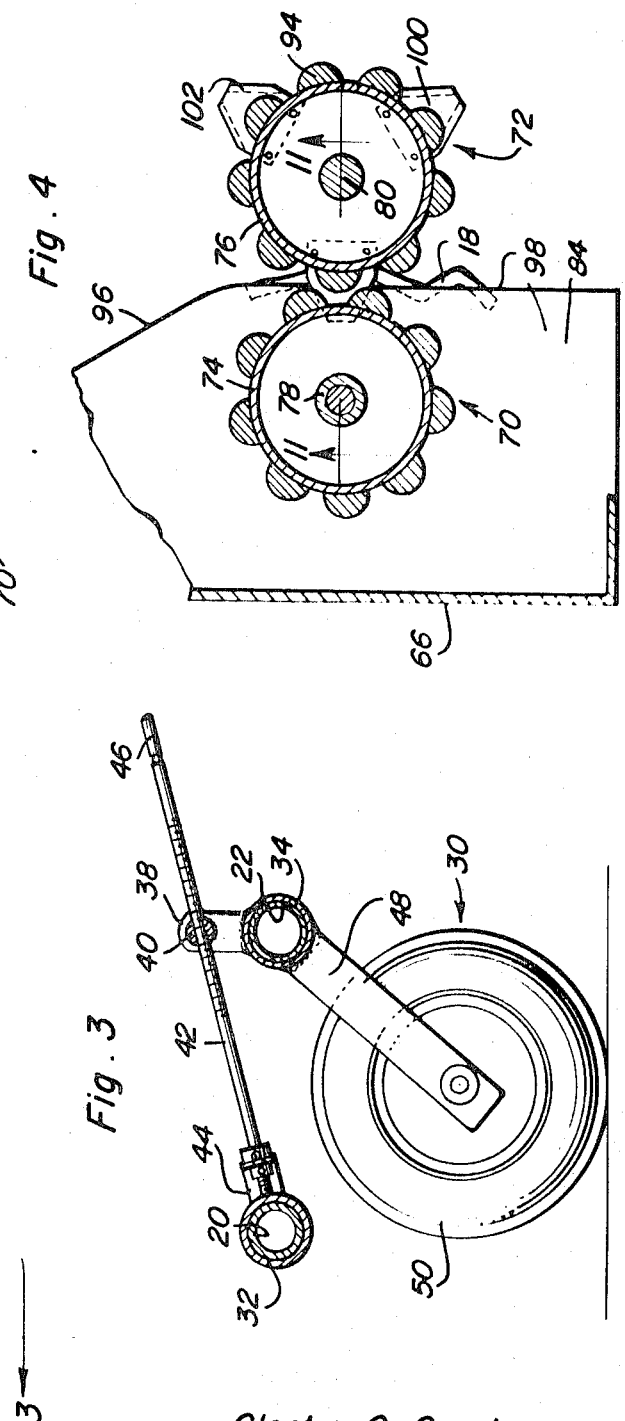
Glenton G. Gaertner
INVENTOR.
BY *Clarence A. O'Brien*
and *Harvey B. Jacobson*
Attorneys

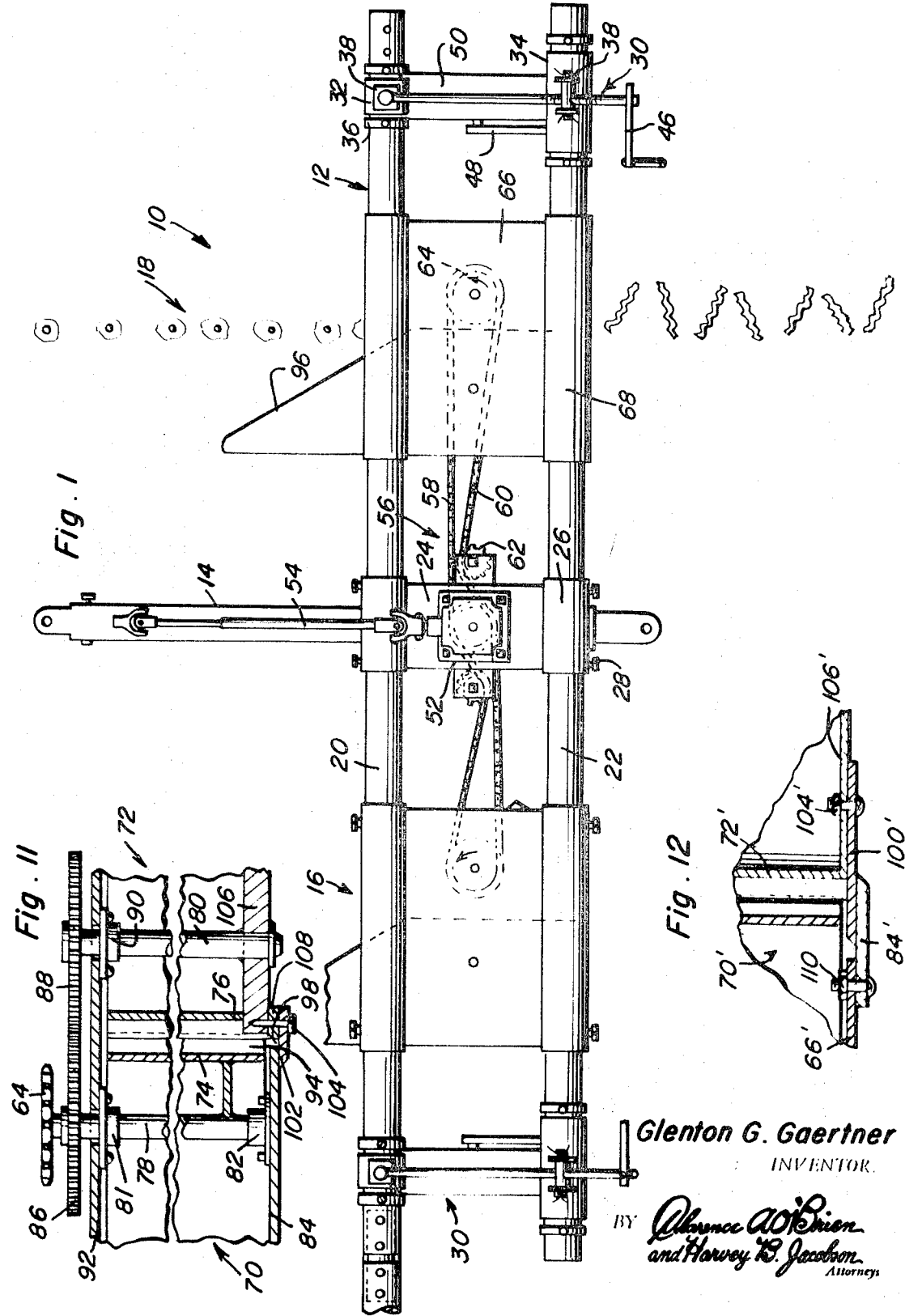

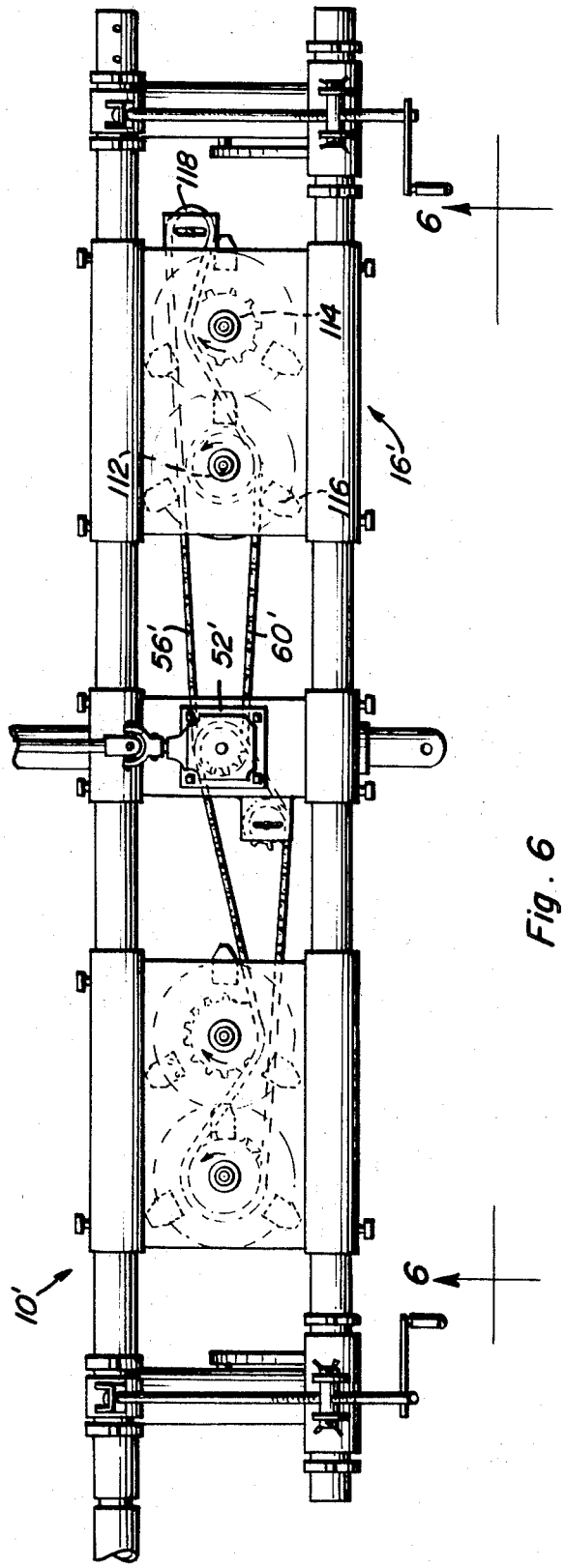
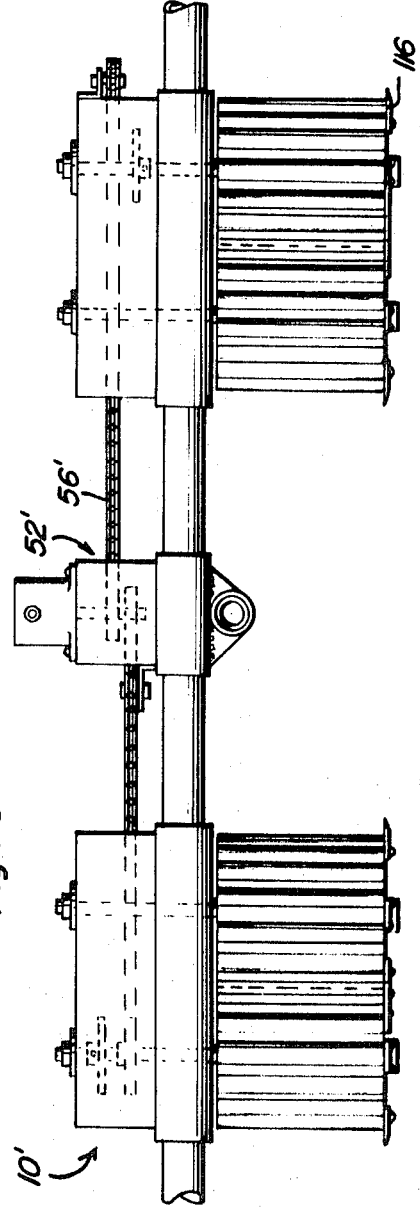

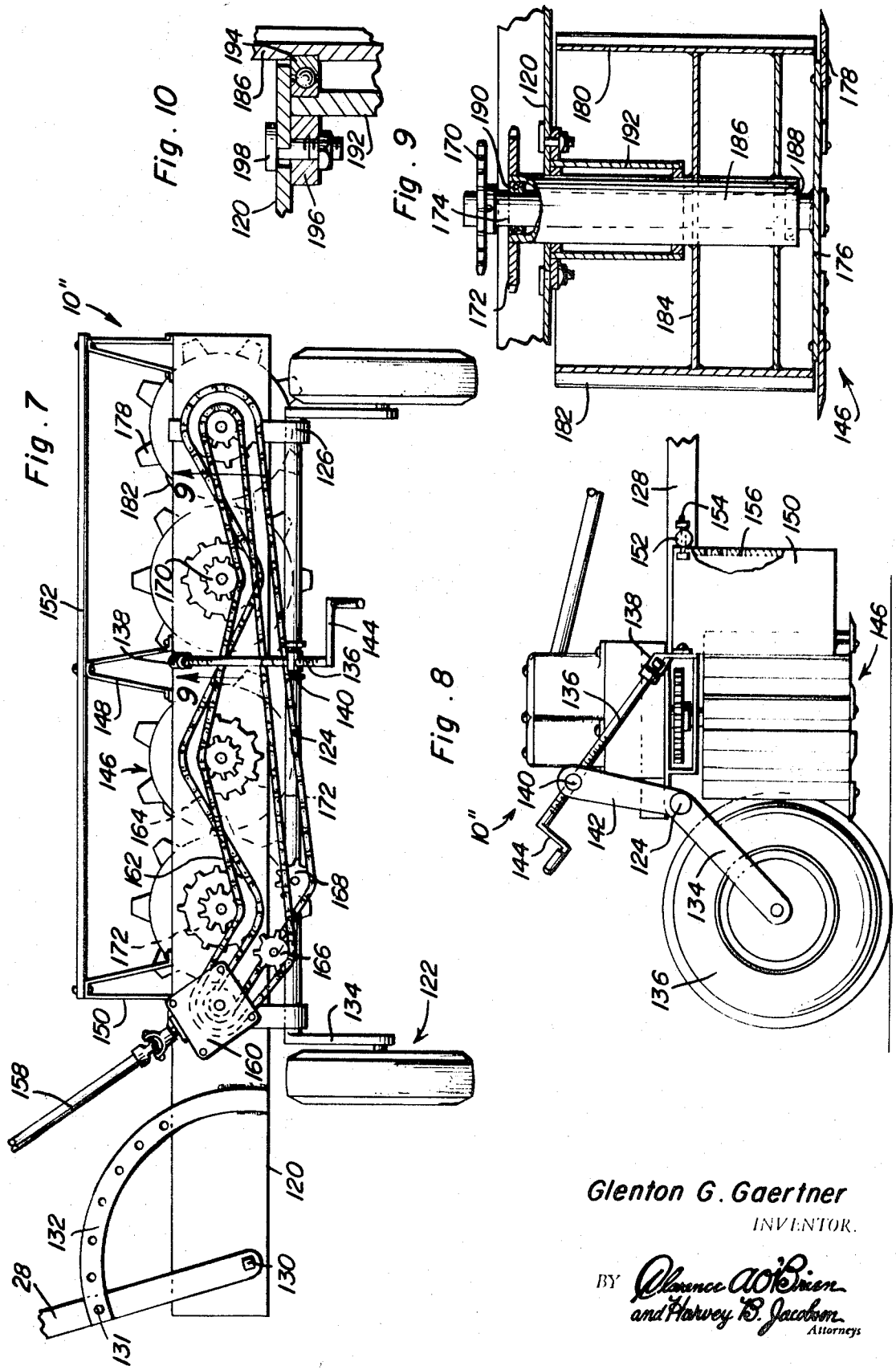

United States Patent Office 3,608,287
Patented Sept. 28, 1971

3,608,287
COMBINATION CUTTER AND CONDITIONER FOR ROW FORAGE
Glenton G. Gaertner, Rte. 2, Box 78,
La Grange, Tex. 78945
Filed May 6, 1969, Ser. No. 822,138
Int. Cl. A01d *41/08*
U.S. Cl. 56—13.7                                   8 Claims

ABSTRACT OF THE DISCLOSURE

Standing stalks of plants are crushed and cut by vertical roller assemblies on a moving frame to cut and condition crops in one operation. Vertically elongated crimping elements on the rollers intermesh to engage the stalks while cutter blades on the lower ends of the rollers cut the stalks.

This invention relates to agricultural machines and more particularly to a combined forage cutter and conditioner.

Standing plants such as forage sorghums, are generally cut a few inches above the ground and then crushed so as to remove moisture for rapid drying purposes. The cutting and squeezing of the stalks is usually performed as separate operations either by separate machines or in a combination machine. The equipment needed for cutting and conditioning the stalks is relatively expensive and somewhat unsatisfactory in that all of the cut stalks are not fully conditioned. The difficulty involved in conditioning the cut stalks, is the inability of the conditioning machine or conditioning component to pick up all of the cut stalks. This inadequacy of existing equipment is further aggrevated by windy conditions. Also, the stalk conditioning apparatus has heretofore required a considerable amount of maintenance because of clogging resulting from pick up of dirt when operating on uneven or rough ground.

It is therefore an important object of the present invention to provide a combined mower and stalk conditioning apparatus which overcomes the drawbacks aforementioned in connection with existing apparatus by more efficiently performing the cutting and conditioning functions in one operation.

In accordance with the present invention, the standing stalks are engaged between intermeshing, crimping elements on vertically elongated roller assemblies mounted on a moving frame. The stalks are engaged between the crimping elements along their vertical length and then are cut just above the ground by cutter blades mounted at the lower ends of the rollers. Thus, the stalks are pulled into the path of the cutter blades while they are being squeezed between the crimping elements on the rollers. The rollers are driven at their upper ends and the cutter blades are rotated in the same direction either at the same speed as the rollers or at a different and more rapid speed. Thus, stalks which have been completely crushed are deposited rearwardly of the moving frame on which the rollers are vertically mounted to dry and subsequently picked up by a forage harvester or baled.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of one form of apparatus constructed in accordance with the present invention.

FIG. 2 is a rear elevational view of the apparatus shown in FIG. 1.

FIG. 3 is a transverse sectional view taken substantially through a plane indicated by section line 3—3 in FIG. 2.

FIG. 4 is an enlarged partial sectional view taken substantially through a plane indicated by section line 4—4 in FIG. 2.

FIG. 5 is a top plan view of another form of apparatus constructed in accordance with the present invention.

FIG. 6 is a partial rear elevational view of the apparatus shown in FIG. 5.

FIG. 7 is a top plan view of a third form of apparatus constructed in accordance with the present invention.

FIG. 8 is a partial side elevational view of the apparatus shown in FIG. 7.

FIG. 9 is an enlarged partial sectional view taken substantially through a plane indicated by section line 9—9 in FIG. 7.

FIG. 10 is an enlarged partial sectional view of a portion of the apparatus shown in FIG. 9.

FIG. 11 is a partial sectional view taken substantially through a plane indicated by section line 11—11 in FIG. 4.

FIG. 12 is a partial sectional view showing a modification of the structure shown in FIG. 11.

Referring now to the drawings in detail, and initially to FIGS. 1 and 2, it will be observed that the apparatus generally referred to by reference numeral 10 includes a mobile frame assembly generally referred to by reference numeral 12 adapted to be towed forwardly through a field by a tractor to which the mobile frame is hitched by the towing bar 14. The frame assembly mounts a plurality of laterally spaced cutting and conditioning assemblies 16 on either side of the bar 14, each assembly 16 being aligned with a row of standing stalks 18 which are to be cut and conditioned.

The frame assembly 12 includes a pair of parallel spaced pipes 20 and 22 which are centrally interconnected by a supporting plate 24 having sleeve portions 26 at the forward and rear ends thereof through which the pipes 20 and 22 extend. Setscrews 28 secure the pipes within the sleeves 26. Adjustable wheel assemblies 30 also interconnect the pipes 20 and 22 on opposite sides of the two assemblies 16 shown in the embodiment of FIGS. 1 and 2. Each wheel assembly includes a forward sleeve 32 through which the pipe 20 rotatably extends and a rear sleeve 34 through which the pipe 22 rotatably extends. The sleeves 32 and 34 are held in axially adjusted positions on the pipes by collars 36. The rear sleeve 34 carries an upstanding bracket 38 as more clearly seen in FIG. 3 which mounts a pivot 40 through which an externally threaded adjustment rod 42 threadedly extends. The rod is rotatably mounted about its longitudinal axis by a bracket 44 secured to the front sleeve 32. A crank 46 is connected to the end of the rod 42 which projects rearwardly from the rear sleeve 34. The rear sleeve 34 also has a wheel supporting arm 48 secured thereto rotatably carrying a wheel 50. It will be apparent therefore, that the angular positions of the support arms 48 relative to the rear pipe 22 may be varied by rotation of the rods 42 through the cranks 46 in order to change the height of the frame assembly supported by the wheels 50 above the ground.

As shown in FIGS. 1 and 2, a gear box 52 is mounted on the support plate 24 and receives power from the towing tractor through a universal shaft assembly 54 including a universal joint 53 connected to the input shaft of the gear box by a shear pin that ruptures on overload to prevent damage to the other parts of the apparatus. Thus, power may be transferred through the gear box to a pair of endless sprocket chains 56 which extend laterally from the gear box toward the assemblies 16. One side of each sprocket chain 56 includes a run 58 disposed generally parallel to the pipes 20 and 22 and an angulated run 60 engaged by chain tightening idler sprocket wheel 62 laterally supported on the side of the support plate 24. The lateraly remote ends of the sprocket chains 56 are entrained about drive sprockets 64 associated with each of the assembies 16.

Each cutting and conditioning assembly 16 includes a housing 66 to which sleeve portions 68 are connected. The pipes 20 and 22 extend through the sleeve portions 68 for suspending the housing from the frame assembly. The housing rotatably mounts a pair of vertical roller assemblies 70 and 72.

Referring now to FIGS. 4 and 11 in particular, it will be observed that the roller assemblies are respectively provided with vertically elongated drums 74 and 76 secured to vertical roller shafts 78 and 80. The roller shaft 78 is journalled by spaced bearing assemblies 81 and 82 fixed to the top and bottom walls 92 and 84 associated with the housing 66. The drive sprocket wheel 64 is connected to the upper end of the shaft 78 which also mounts a gear member 86 in mesh with the gear member 88 secured to the upper end of the other roller shaft 80. The roller shaft 80 is journalled by a bearing assembly 90 secured to the horizontal wall 92 of the housing below which the roller assemblies 70 and 72 are disposed. Thus, the roller assemblies are journaled for rotation about vertical, parallel spaced axes and are geared for rotation in opposite directions.

Each of the roller drums 74 and 76, mounts a plurality of circumferentially spaced, crimping elements 94 which project radially from the roller drums. The drums are spaced from each other a distance to permit intermeshing of the crimping elements 94 which extend vertically the entire length of the roller drums. The axial height of the roller assemblies are designed to accommodate the height of the stalks to be conditioned by the apparatus. Thus, as the assembly 16 is moved forwardly along the plant row, the stalks 18 are engaged between the crimping elements 94, crushing and squeezing them to remove moisture. The stalks are guided into engagement between the intermeshing crimping elements by the forwardly inclined guide edge 96 on the bottom wall 84 which also has a shear edge 98 centrally disposed between the roller drums 74 and 76.

The shear edge 98 of the plate 84 forms part of the cutting means associated with the roller assemblies. The cutter means includes a plurality of cutter blades 100 which are less in number than the crimping elements, secured to the lower end of the roller assembly 72. The cutter blades converge radially outwardly from the roller drum 76 and have downward beveled edges 102 which overlap the shear plate 84 and pass therebelow as more clearly seen in FIG. 11. The cutter blades are secured by fasteners 104 to a bottom plate 106 secured to the roller shaft 80 and to which the drum 76 is connected. A spacer 108 is disposed between the cutter blade and the bottom plate 106 so as to position the blade in proper relation to the shear plate 84. Thus, at the same time that the roller assemblies intermesh through the crimping elements 94 to crush the stalks, the cutter blades 100 cooperates with the shear plate 84 to sever the stalks a short distance above the ground determined by the height adjustment of the wheel assemblies 30.

FIG. 12 illustrates a modification of the assemblies 16 in that a separate and removable shear plate 84' is secured by a removable fastener assembly 110 to the bottom wall of a housing 66' associated with one of the roller assemblies 70'. Except for the removable mounting of the shear plate 84', the roller assembly 70' is the same as the roller assembly 70 hereinbefore described. The roller assembly 70' cooperates with a roller assembly 72' which is similar to the roller assembly 72 hereinbefore described except that the cutter blades 100' are directly fastened by fasteners 104' to a bottom wall 106' of the roller assembly, the cutter blades 100' being disposed above the removably mounted, stationary shear plate 84'. Thus, the shear plate 84' like the cutter blades may be removed for sharpening or replacement.

FIGS. 5 and 6 illustarte apparatus generally referred to by reference numeral 10' which is similar in construction and operation to the apparatus 10 illustrated in FIGS. 1–4, and 11 except for the drive arrangement for the cutter and conditioning assemblies 16'. The apparatus 10' also includes a central gear box 52' through which a pair of endless sprocket chains 56' are driven to transmit power to the assemblies 16'. One run 60' of each sprocket chain engages separate drive sprockets 112 and 114 associated with the intermeshing roller assemblies causing them to rotate in the opposite direction. Cutter blades 116 are secured to the lower ends of each roller assembly and the cutter blades on respective roller assemblies are synchronized to avoid interfering with each other as seen in FIG. 5. The sprocket chains 60' are entrained about chain tightening idler sprockets 118 carried by the assemblies 16' on sides remotely spaced from the central gear box 52'. Thus, the apparatus 10' differs from apparatus 10 in that both rollers are driven and the stationary shear blade is replaced by rotating cutting blades. As in the case of the cutter and conditioning assemblies 16, the assemblies 16' are provided with a larger number of crimping elements than cutter blades so as to insure that the stalks are effectively engaged and crushed before being cut.

A third form of apparatus 10'' is shown in FIGS. 7 and 8. The apparatus 10'' includes an elongated channel frame 120 supported above the ground by a pair of adjustable wheel assemblies 122 which are interconnected by a shaft 124 disposed rearwardly of and parallel to the frame 120. The shaft 124 is supported by a pair of straps 126 extending rearwardly from the frame which extends laterally of the left hand wheel assembly as shown in FIG. 7. This arrangement permits the apparatus to be towed in laterally offset relation to the towing tractor vehicle to which it is hitched by a towing bar 128. The adjusted angular relationship between the towing bar and the pivot 130 on frame 120 is maintained by a locking bolt 131 placed in a desired hole in an adjustment arc 132.

Each wheel assembly 122 includes a support arm 134 rotatably mounting a supporting wheel 136 adjacent its lower end. The supporting arms are connected at their upper ends to the shaft 124 so that both wheel assemblies may be angularly positioned for height adjustment purposes by means of a single, centrally located adjustment rod 136. The adjustment rod is rotatably mounted about its longitudinal axis by a bracket 138 centrally secured to the forward edge of the frame 120. The adjustment rod is threadedly received through a pivot element 140 carried by an upwardly extending arm 142 fixed to the shaft 124. Rotation of the adjustment rod by means of the crank 144 at its upper end will change the angular postion of the shaft 124 in order to vary the height of the frame and the intermeshing pairs of roller assemblies 146 that are suspended from the frame.

The apparatus 10'' will cut and condition broadcast crops as well as row crops and toward this end, is provided with a centrally located feed divider 148 which extends in forwardly converging relation to the frame 120 to which it is attached between two pairs of roller assemblies 146. Guide frames 150 are also secured to the forward edge of the frame 120 and extend forwardly therefrom. The feed divider and guide frames are interconnected at their forward ends by a bend bar 152. The bend bar may be secured by fasteners 154 to the divider and guide frames at a vertically adjusted position. Fastener receiving apertures 156 are accordingly provided in the divider and guide frames for this purpose, as more clearly shown in FIG. 8.

In view of the laterally offset disposition of the apparatus 10'' relative to the towing vehicle, power is transmitted to the roller assemblies 146 through a universal shaft assembly 158 and gear box 160 which are angularly related to the frame 120 at one side of the roller assemblies. Power is transmitted through the gear box 160 to a pair of endless sprocket chains 162 and 164 respectively held in tensioned condition by chain tightening idler sprockets 166 and 168. One run of the sprocket chain 162 is engaged with alternately opposite sides of the upper sprocket wheels 170 associated with each of the roller assemblies 146. The other sprocket chain 164 engages alternately opposite sides of sprocket wheels 172 also associated with each of the roller assemblies. Thus, each of the intermeshing roller assemblies are rotated in opposite directions as in the case of the apparatus 10′ illustrated in FIGS. 5 and 6. However, unlike apparatus 10 and 10′ hereinbefore described, drive is imparted to the roller drums and cutters at different speeds through the sprocket wheels 170 and 172.

Referring now to FIG. 9, it will be observed that the upper sprocket wheel 170 is connected to an inner shaft 174, the lower end of which is connected to a rotor plate 176 to which the cutter blades 178 are secured in equal angularly spaced relation to each other. The cutter blades 178 project radially beyond the roller drum 180 and the crimping elements 182 externally mounted thereon. The roller drum 180 is secured by internal webs 184 to a hollow shaft 186 through which the inner shaft 174 extends. Bearing assemblies 188 and 190 are mounted at the lower and upper ends the of the hollow shaft 186 so as to journal the inner shaft 174 therein. The sprocket wheel 172 is connected to the upper end of the hollow shaft 186 so as to impart rotation to the roller drum at a different angular speed than the cutters. Both the shafts 174 and 186 are mounted for rotation about a vertical axis by a tubular member 192 having spaced upper and lower bearings 194. The tubular member 192 has a flange 196 secured thereto so that it may be removably suspended from the frame 120 by fastener assemblies 198 as more clearly shown in FIG. 10. Thus, the roller assemblies 146 are mounted for rotation about vertical axes while the cutter blades 178 are rotated three times the speed of the roller drum 180. The stalks of broadcast crops as well as row crops will thus be crimped between the intermeshing crimping elements 182 and cut at the lower ends of the roller assemblies at an adjustable height above the ground by means of the cutter blades 178. Cut and conditioned forage will therefore be deposited rearwardly of the apparatus 10″ as it moves through the field leaving spaced apart windrows between which tractor wheels may run.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An agricultural machine for mowing and conditioning vertical stalks of plants comprising a mobile frame adapted to be moved in a forward direction, a pair of rollers having opposite axial ends, means mounting said rollers on the frame for rotation about spaced, vertical axes, elongated crimping elements mounted in circumferentially spaced relation on each of said rollers extending between the ends thereof, the crimping elements on the respective rollers intermeshing with each other between the roller to engage and crush the stalks during movement of the frame, cutter means mounted at the lower of the ends of the rollers for severing the stalks engaged between the intermeshing crimping elements, and drive means connected to the upper ends of the rollers for imparting rotation to the rollers and the cutter means in the same direction, said drive means including separate drive members connected to the rollers and the cutter means rotating the cutter means more rapidly than the roller means.

2. The combination of claim 1 wherein said cutter means includes angularly spaced cutter blades connected to at least one of the rollers and projecting radially therefrom below the other of the rollers.

3. The combination of claim 2 wherein the cutter means further includes a shear plate fixedly mounted by the frame extending from said other of the rollers in overlapping relation to the crimping elements and cutter blades on said one of the rollers.

4. The combination of claim 3 wherein the cutter blades are less in number than the crimping elements.

5. The combination of claim 4 including guide means mounted by the frame and projecting forwardly from the rollers in the direction of movement of the frame for deflecting the stalks into engagement with the intermeshing crimping elements.

6. An agricultural machine for mowing and conditioning vertical stalks of plants comprising a mobile frame adapted to be moved in a forward direction, a pair of rollers having opposite axial ends, means mounting said rollers on the frame for rotation about spaced, vertical axes, elongated crimping elements mounted in circumferentially spaced relation on each of said rollers extending between the ends thereof, the crimping elements on the respective rollers intermeshing with each other between the rollers to engage and crush the stalks during movement of the frame, and cutter means mounted at the lower of the ends of the rollers for severing the stalks engaged between the intermeshing crimping elements, and said cutter means including angularly spaced cutter blades connected to at least one of the rollers and projecting radially therefrom below the other of the rollers, a shear plate fixedly mounted by the frame extending from said other of the rollers in overlapping relation to the crimping elements and cutter blades on said one of the rollers.

7. The combination of claim 6 including guide means mounted by the frame and projecting forwardly from the rollers in the direction of movement of the frame for deflecting the stalks into engagement with the intermeshing crimping elements.

8. An agricultural machine for moving and conditioning vertical stalks of plants comprising a mobile frame adapted to be moved in a forward direction, a pair of rollers having opposite axial ends, means mounting said rollers on the frame for rotation about spaced, vertical axes, elongated crimping elements mounted in circumferentially spaced relation on each of said rollers extending between the ends thereof, the crimping elements on the respective rollers intermeshing with each other between the rollers to engage and crush the stalks during movement of the frame, and cutter means mounted at the lower of the ends of the rollers for severing the stalks engaged between the intermeshing crimping elements, and said cutter means including angularly spaced cutter blades connected to at least one of the rollers and projecting radially therefrom below the other of the rollers, the cutter blades being less in number than the crimping elements.

References Cited

UNITED STATES PATENTS

| 1,576,405 | 3/1926 | Bradshaw | 56—503 |
| 2,972,848 | 2/1961 | McKee | 56—16 |

ROBERT PESHOCK, Primary Examiner

U.S. Cl. X.R.

56—Dig. 1, 14.1